United States Patent
Facchinello et al.

(10) Patent No.: US 9,545,835 B2
(45) Date of Patent: Jan. 17, 2017

(54) TONNEAU COVER SYSTEM AND CLAMP

(71) Applicant: Extang Corporation, Ann Arbor, MI (US)

(72) Inventors: Jerome J. Facchinello, Grand Blanc, MI (US); Charles A. Fabros, Downers Grove, IL (US); Brian P. Kozlowski, Canton, MI (US)

(73) Assignee: Extang Corporation, Ann Arbor, MI (US)

( * ) Notice: Subject to any disclaimer, the term of this patent is extended or adjusted under 35 U.S.C. 154(b) by 0 days.

(21) Appl. No.: 14/875,911

(22) Filed: Oct. 6, 2015

(65) Prior Publication Data
US 2016/0096423 A1    Apr. 7, 2016

Related U.S. Application Data

(60) Provisional application No. 62/060,637, filed on Oct. 7, 2014.

(51) Int. Cl.
| | |
|---|---|
| *B60J 7/00* | (2006.01) |
| *B60J 7/19* | (2006.01) |
| *B60J 7/10* | (2006.01) |
| *B60J 7/14* | (2006.01) |

(52) U.S. Cl.
CPC .............. *B60J 7/198* (2013.01); *B60J 7/106* (2013.01); *B60J 7/102* (2013.01); *B60J 7/141* (2013.01)

(58) Field of Classification Search
CPC ......... B65D 45/00; B65D 45/02; B65D 45/16; B65D 45/18; B65D 45/30; E05C 19/18; E05C 19/188; Y10S 292/49
USPC ......... 292/256, 258, 256.71, 256.73, 256.75; 296/100.04, 100.07, 100.16; 248/229.13, 248/229.23, 228.4, 230.4, 231.51, 640, 248/641, 643; 269/218, 239, 249, 182, 269/258, 268

See application file for complete search history.

(56) References Cited

U.S. PATENT DOCUMENTS

| | | | | |
|---|---|---|---|---|
| 3,178,139 | A * | 4/1965 | McFarlin | G09F 17/00 116/28 R |
| 3,468,577 | A * | 9/1969 | Mazerka | E05B 65/006 220/325 |
| 4,846,431 | A * | 7/1989 | Pflieger | F16B 2/065 24/514 |
| 5,460,423 | A | 10/1995 | Kersting et al. | |
| 5,462,249 | A * | 10/1995 | Calzone | B60P 1/43 14/71.1 |
| 5,540,475 | A | 7/1996 | Kersting et al. | |
| 5,655,808 | A | 8/1997 | Wheatley | |

(Continued)

*Primary Examiner* — Janet M Wilkens
(74) *Attorney, Agent, or Firm* — Harness, Dickey & Pierce, PLC (57) ABSTRACT

A clamp for clamping a tonneau cover to a vehicle cargo box. The clamp can include a first member, a second member, a rod, and a driving member. The first member can have a proximal end pivotably coupled to the cover and a distal end pivotably coupled to a proximal end of the second member. The second member can have a distal end extending at an angle relative to its proximal end and toward the cover. The rod can be coupled to the first member's proximal end and can extend through an opening intermediate the second member's proximal and distal ends. The driving member can be mounted on the rod to engage the second member between its proximal and distal ends to drive the second member along the rod and to cause the first and second members to pivot relative to each other between unclamped and clamped positions.

27 Claims, 6 Drawing Sheets

(56) References Cited

U.S. PATENT DOCUMENTS

| | | | | |
|---|---|---|---|---|
| 6,893,012 B2* | 5/2005 | Wong | ............... | B25B 5/006 |
| | | | | 269/182 |
| 7,188,888 B2 | 3/2007 | Wheatley et al. | | |
| 7,258,387 B2 | 8/2007 | Weldy | | |
| 7,823,957 B2* | 11/2010 | Williamson | ............ | B60J 7/104 |
| | | | | 292/256 |
| 8,085,481 B2* | 12/2011 | Hill | ............ | G03B 3/00 |
| | | | | 248/229.24 |
| 8,807,625 B2 | 8/2014 | Garska | | |
| 8,960,764 B2 | 2/2015 | Spencer | | |
| 2005/0035249 A1* | 2/2005 | Busuito | ............ | A01M 31/00 |
| | | | | 248/215 |
| 2008/0129077 A1* | 6/2008 | Weldy | ............ | B60J 7/141 |
| | | | | 296/136.03 |
| 2010/0270824 A1* | 10/2010 | Yue | ............ | B60J 7/198 |
| | | | | 296/100.07 |
| 2012/0274092 A1* | 11/2012 | Yue | ............ | B60J 7/141 |
| | | | | 296/100.07 |
| 2014/0042754 A1 | 2/2014 | Spencer | | |
| 2015/0108306 A1* | 4/2015 | Chuang | ............ | F16M 11/14 |
| | | | | 248/231.51 |
| 2015/0130212 A1 | 5/2015 | Spencer | | |

* cited by examiner

TONNEAU COVER SYSTEM AND CLAMP

CROSS-REFERENCE TO RELATED APPLICATIONS

This application claims the benefit of U.S. Provisional Application No. 62/060,637, filed on Oct. 7, 2014. The entire disclosure of the above application is incorporated herein by reference.

FIELD

The present disclosure relates to tonneau covers for vehicles. More particularly, the present disclosure relates to a clamp for use in a tonneau cover system.

BACKGROUND

This section provides background information related to the present disclosure which is not necessarily prior art.

Tonneau covers have been used for a number of years to cover the cargo box of pickup trucks against dirt, debris, and other environmental contaminants and to improve the aesthetic quality thereof. Originally, tonneau covers were designed by upholstery shops and typically made of vinyl covered fabrics or canvas. The material was often doubled over along its edges for added strength and appearance. Male snaps were then attached to the sides of the cargo box of the pickup truck via fasteners, while female snaps were attached along the edges of the cover. Wooden bows were sometimes used to span the cargo box and ensure that the cover remained high enough to drain water. Unfortunately, these covers were sometimes difficult to handle and/or manufacture and occasionally failed to protect the cargo box.

More recently, foldable tonneau covers are often more desirable in that they conveniently cover the bed of the pickup truck for cargo protection. However, when not in use, the foldable tonneau cover may be folded toward the rear of the passenger cabin (or other location). Generally, foldable tonneau covers include a frame network of cross bows, a tarp or covering operably coupled to and spanning the frame network, a latching or clamp system for coupling the frame network to the pickup truck and a means for stowing the clamp system, and a hinge system for hingedly coupling adjacent sections of the foldable tonneau cover. However, the known prior art fails to maximize the ease and effectiveness of foldable tonneau covers and, thus, many foldable tonneau covers suffer from numerous disadvantages.

By way of example, existing clamp systems generally employ an over-center cam lock arrangement, wing nut clamp arrangement, and/or spring biased clamp arrangement to fasten the tonneau cover in place relative to the pickup truck. The clamps typically hook onto the downwardly projecting (metal) flange of the truck bed. Such clamps, in the case of the cam lock arrangement, are adjustable by rotating a threaded cam pivot to permit attachment of the clamps to pickup trucks with differing length downwardly projecting flanges. The other clamping systems can use threaded portions or other telescoping type mechanisms to provide a length adjustment feature.

However, these clamping systems lead to various problems or failures when used with more recent pickup truck bed designs produced by original equipment manufacturers (OEM). For instance, many of the newer sidewall flanges of pickup truck beds can become deformed under the extreme load that can be exerted by clamping systems. In fact, several new vehicles being designed are contemplating changes to the flange material or reducing the flange thickness. The result might be a less structural flange which could be distorted when using typical tonneau clamp designs clamped to such downwardly extending flanges of the truck bed box. Consequently, as a conventional tonneau cover clamp is tightened in place, a user can exert sufficient force that causes the sidewall flange of the pickup truck bed to become permanently deformed.

Accordingly, there exists a need in the relevant art to provide a tonneau cover system capable of overcoming the disadvantages of the prior art. Additionally, there exists a need to provide sufficient retention capability to retain the tonneau cover on the pickup truck bed without causing permanent deformation.

SUMMARY

This section provides a general summary of the disclosure and is not a comprehensive disclosure of its full scope or all of its features.

According to an aspect of the present disclosure, a tonneau cover system is provided for a cargo box of a pickup truck. The cargo box can include a ledge and a flange that can extend downwardly from the ledge. The tonneau cover system can include a tonneau cover and a clamp. The tonneau cover can be configured to cover the cargo box. The clamp can be configured to secure the tonneau cover to the cargo box. The clamp can include a first clamp member, a second clamp member, and an elongate member. The first clamp member can be pivotably coupled to the tonneau cover at a proximal end and can have a distal end. The second clamp member can have a proximal end pivotably coupled to the distal end of the first clamp member. The second clamp member can have a distal end extending at an angle relative to the proximal end of the second clamp member and toward the tonneau cover. The elongate member can be coupled to the proximal end of the first clamp member and can extend through an opening intermediate the proximal and distal ends of the second clamp member. Sliding movement of the second clamp member along the elongate member can cause the first and second clamp members to pivot relative to each other between an unclamped position and a clamped position. In the clamped position, the distal end of the second clamp member can extend adjacent the flange and can engage a first clamping surface of the distal end of the second clamp member against an interior surface of the ledge.

According to another aspect of the present disclosure, a tonneau cover clamp is provided for clamping a tonneau cover to a cargo box of a pickup truck. The cargo box can include a ledge and a flange extending downwardly from the ledge. The tonneau cover clamp can include a first clamp member, a second clamp member, a rod, and a manually actuatable driving member. The first clamp member can be pivotably coupled to the tonneau cover at a proximal end and can have a distal end. The second clamp member can have a proximal end pivotably coupled to the distal end of the first clamp member. The second clamp member can have a distal end extending at an angle relative to the proximal end of the second clamp member and toward the tonneau cover. The rod can define an axis and can be coupled to the proximal end of the first clamp member. The rod can extend through an opening intermediate the proximal and distal ends of the second clamp member. The driving member can be mounted on the rod to engage the second clamp member between its proximal and distal ends to drive the second clamp member along the axis of the rod and cause the first and second clamp members to pivot relative to each other between an unclamped position and a clamped position.

According to another aspect of the present disclosure, a tonneau cover system is provided for a cargo box of a vehicle. The cargo box can include a ledge and a flange extending downwardly from the ledge. The tonneau cover system can include a tonneau cover, a first clamp, a second clamp, a rod, and a driving member. The tonneau cover can be configured to cover the cargo box. The first clamp member can have a proximal end and a distal end. The proximal end of the first clamp member can be pivotably coupled to the tonneau cover. The second clamp member can have a main body and a lip. One end of the main body can be pivotably coupled to the distal end of the first clamp member. An opposite end of the main body can be fixedly coupled to the lip. The main body can define an aperture between the lip and the end of the main body that is pivotably coupled to the first clamp member. The lip can extend from the distal end of the main body at an angle relative to the main body and toward the proximal end of the first clamp member. The rod can have a proximal end and a distal end. The proximal end of the rod can be coupled to the first clamp member. The rod can be received through the aperture defined by the main body. The rod can define a plurality of external threads. The driving member can be matingly engaged with the external threads of the rod. Relative rotation between the driving member and the rod can drive the second clamp member axially along the rod between an unclamped position and a clamped position. When the second clamp member is in the unclamped position, the lip and the proximal end of the first clamp member can be a first distance apart. When the second clamp member is in the clamped position, the lip and the proximal end of the first clamp member can be a second distance apart that is less than the first distance.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

FIGS. 1-6 illustrate one exemplary tonneau cover system 10 for covering a truck bed or cargo box 11 in accordance with the present disclosure. In some cases, the truck bed or cargo box 11 can be part of a pickup truck 13 as shown. The cargo box 11 includes a frame that can have an outboard wall 16, a ledge 18 extending inboard from the outboard wall 16, and a flange 20 extending downwardly from the ledge 18 and spaced inboard from the outboard wall 16. The flange 20 includes an outboard face or side 22 facing the outboard wall 16, an inboard face or side 24 opposite the outboard side 22, and a bottom side or edge 25 facing downward.

Figure 1:
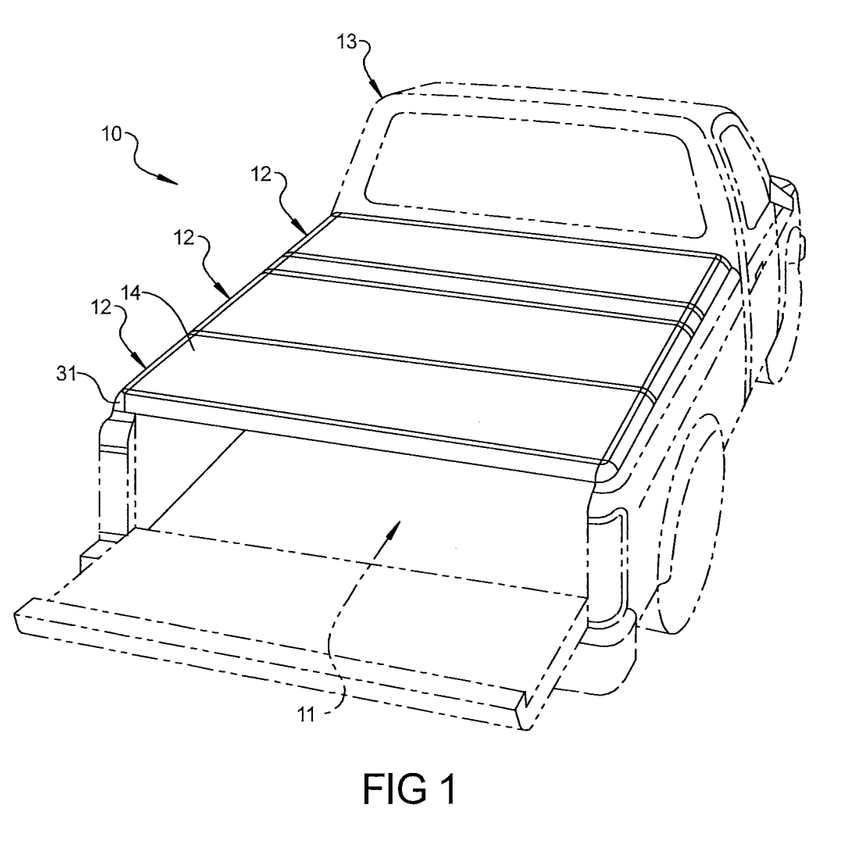
FIG. 1 is a perspective view of one exemplary embodiment of a tonneau cover system with a clamp in accordance with the present disclosure.
Figure 2:
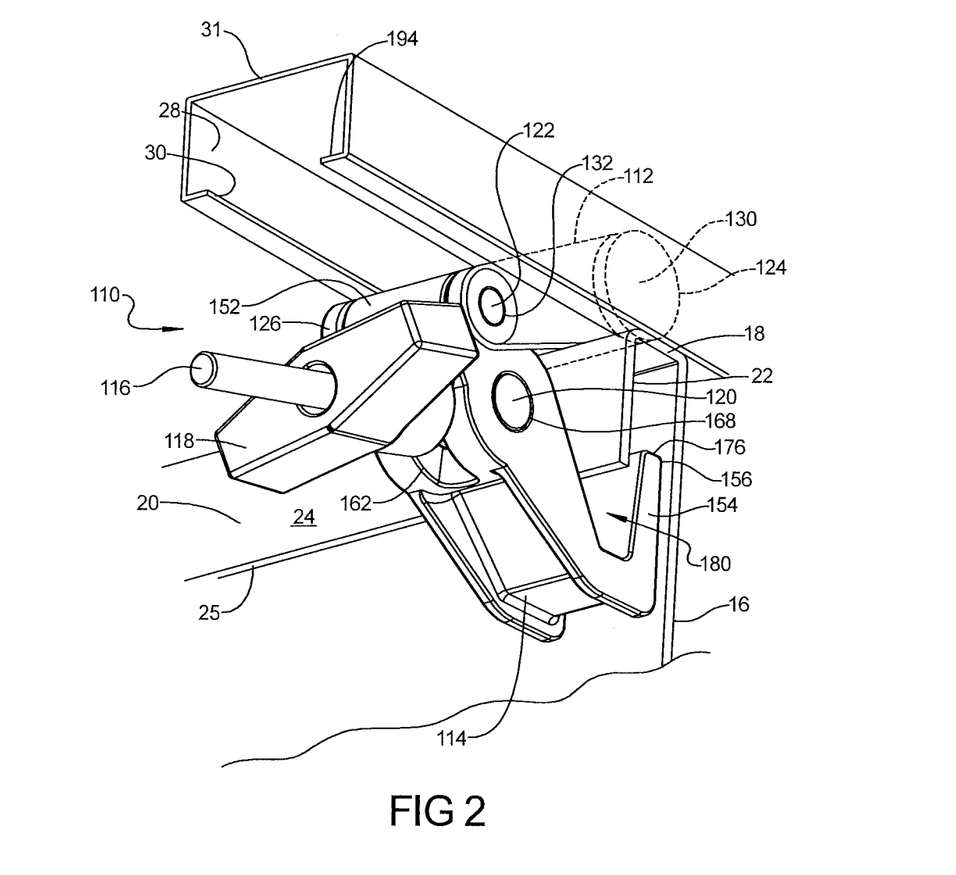
FIG. 2 is a partial perspective view of one exemplary embodiment of a clamp of the tonneau cover system of FIG. 1 in an unclamped position, with a portion of a cargo box.
Figure 3:
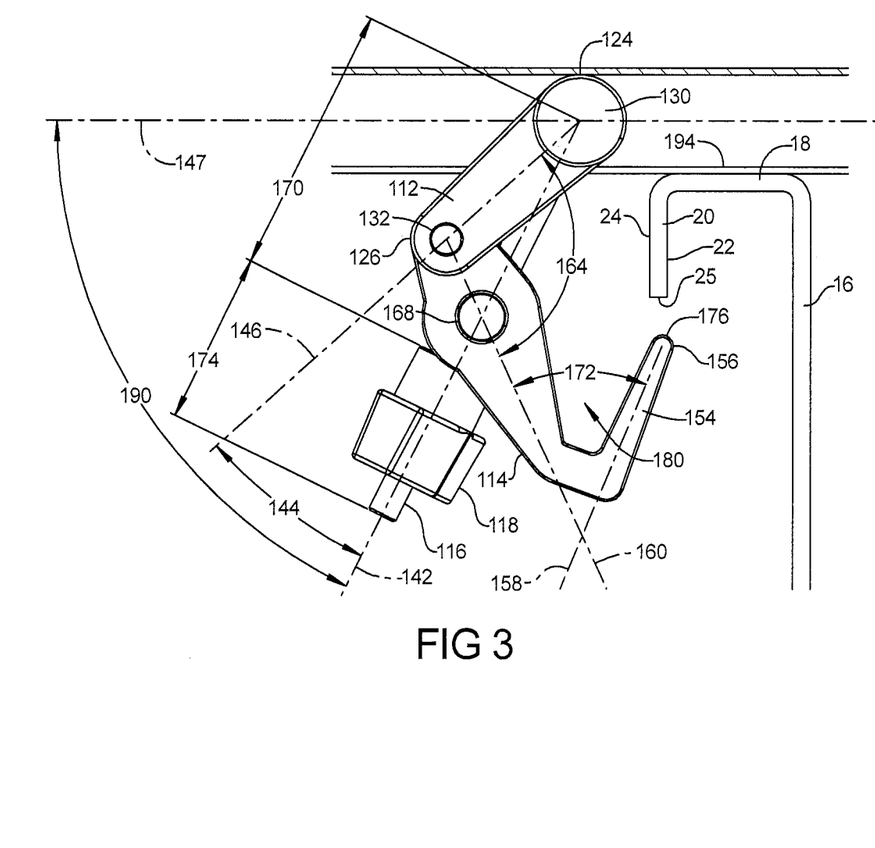
FIG. 3 is a side plan view of components of the tonneau cover system with the clamp of FIG. 2 in the unclamped position, with a partial cross-sectional view of the cargo box.
Figure 4:
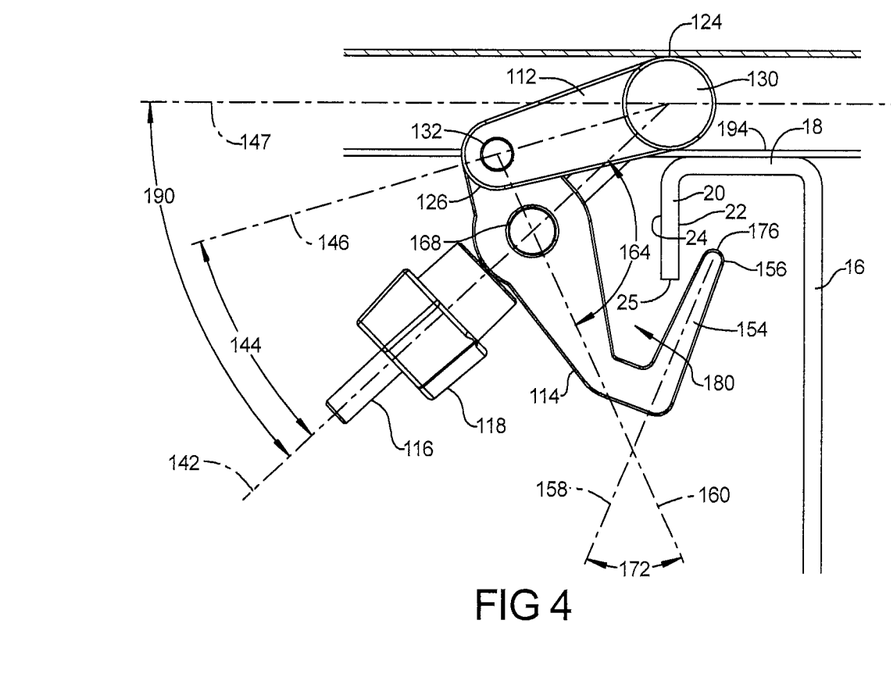
FIG. 4 is a side plan view of the clamp of FIG. 2 in an intermediate position, with a partial cross-sectional view of the cargo box.

The tonneau cover system 10 can include a cover and a clamp 110. In some embodiments, the tonneau cover 10 can include a plurality of sections 12 foldable between a deployed arrangement covering the cargo box 11 and a folded arrangement wherein the sections 12 are stacked, allowing access to the cargo box 11. In some embodiments, each section 12 of the tonneau cover 10 can comprise a plurality of frame and/or bow members 31 that together form a rectangular frame supporting a fabric, textile or other flexible sheet material 14 spanning the rectangular frame. In some embodiments, each of the plurality of sections 12 can alternatively comprise a generally rigid panel as the spanning material 14, and which can optionally include frame members 31 around the periphery of the rigid panel 14 that can similarly form the rectangular frame. Other tonneau cover configurations are, of course, possible.

In some embodiments, the frame members 31 of the tonneau cover 10 can comprise an extruded metal rail having a C-shaped cross-section defining a longitudinal internal channel 28 with a longitudinally extending central opening 30. The channel 28 and opening 30 can extend longitudinally along the length of the frame member 31 across the cargo box 11. The frame members 31 can define a central or main longitudinal axis 147 thereof.

In some embodiments, the clamp 110 can be pivotably coupled to one of the frame members 31 and can include a first clamp member 112, a second clamp member 114, an elongated member or rod 116, and a positioning or driving member 118. The clamp 110 can also include a guide pin 120 and a pivot pin 122. The first clamp member 112 can have a proximal end, section, or portion 124 and a distal end, section, or portion 126. The proximal end 124 of the first clamp member 112 can include a pivot coupling or barrel 130.

The barrel or coupling member 130 can be generally cylindrical in shape. In the example provided, the barrel 130 can be integrally formed with the proximal end 124 of the first clamp member 112. The barrel 130 can be received within the channel 28 of the frame member 31, can pivot about the longitudinal axis of the barrel 130, and can slide along a longitudinal direction or axis 147 of the channel 28 when retained within the channel 28. As in the illustrated embodiment, the barrel 130 can include an opening or aperture 140 by which the elongated member 116 can extend through the barrel 130 and can be coupled thereto. Retainer members 150 can be configured to restrain axial movement of the rod 116 within the aperture 140 of the barrel 130.

The distal end 126 of the first clamp member 112 can extend longitudinally from the proximal end 124 of the first clamp member 112. The distal end 126 of the first clamp member 112 can include a pivot opening or aperture 132. The pivot or coupling aperture 132 can be configured to receive the pivot pin 122 to couple the first clamp member 112 to the second clamp member 114. The first clamp member 112 can define a first, central, longitudinal, or main axis 146 thereof. In some embodiments, this axis 146, of the first clamp member 112, can extend through the center of the pivot aperture 132, the pivot pin 122 or corresponding pivot point and the center or pivot point of the barrel or pivot coupling 130.

The second clamp member 114 can have a proximal end, section, portion or main body 152, and a distal end, section, portion 156 including a portion or lip 154 extending upwardly at an angle relative to the proximal end 152 of the second clamp member 114 and toward the tonneau cover 10. The proximal end 152 of the second clamp member 114 can include a cooperating pivot opening or aperture 166 through which pivot pin 122 can extend to pivotably couple the distal end 126 of the first clamp member 112 to the proximal end 152 of the second clamp member 114 via coupling aperture 132 of the first clamp member 112 and define a pivot point therebetween.

The second clamp member 114, such as the proximal end 152 thereof, can define a central, longitudinal or main axis 160 of the second clamp member 114. In some embodiments, this longitudinal axis 160 of the second clamp member 114, can extend through the center of the pivot aperture 166, the pivot pin 122 or corresponding pivot point and the center of the guide pin aperture 168, the guide pin 120 or corresponding pivot point. Similarly, the upwardly extending portion 154 of the distal end 156 of the second clamp member 114 can generally define a main, central, or longitudinal axis 158.

Thus, in some embodiments, the longitudinal axis 160 of the proximal end and the longitudinal axis 158 of the upwardly extending portion 154 of the distal end 156 of the distal end 156 of second clamp member 114 can define the upwardly extending angle 172 therebetween. This angle 172 can, in some embodiments, be less than or equal to 90°, such that the distal end 156 and proximal end 152 of the second clamp member 114 can generally form an "L" shaped, "U" shaped, or "V" shaped valley, recess, channel, or space 180 therebetween.

The upwardly extending portion 154 of the distal end 156 of the second clamp member 114 can comprise a clamping surface 176 positioned to engage an interior surface of the ledge 18 when the clamp is in the clamped position. The second clamp member 114 can include an elongated opening, aperture, or slot 162 located generally intermediate or between the proximal end 152 and the distal end 156 of the second clamp member 114. The slot 162 can extend through the second clamp member 114 and can be generally elongated. The guide pin 120 can be pivotably coupled to the second clamp member 114 and can extend through the elongate slot 162.

As in the illustrated embodiment, the elongate member 116 can extend through an opening intermediate the proximal end 152 and the distal end 156 of the second clamp member. In some embodiments this intermediate opening can be the elongate slot 162 of the second clamp member 114, an aperture 178 of the guide pin 120, or both. The guide pin 120 can have a generally cylindrical shape and can be rotatably received in the guide pin aperture 168 of the second clamp member 114. The aperture 178 can generally align with the slot 162 when the guide pin 120 is received in the guide pin aperture 168. The elongated member 116 can extend through an elongate slot 162 of the second clamp member 114, an aperture 178 of the guide pin 120, or both, so that the second clamp member 114 can be slidably mounted on and pivotably coupled to the elongated member 116.

The elongate member or rod 116 can be non-rotatably coupled to the first clamp member 112 and can extend out of the channel 28 through the opening 30 to be axially slidably received through the slot 162. In the example provided, the rod 116 can be threaded along a portion of its length. The retainer members 150 can extend at least partially over the head of the rod 116 to inhibit axial movement of the head of the rod 116 away from the first clamp member 112. The elongate member 116 can define a longitudinal, central, or main axis 142 thereof.

The driving member 118 can be mounted on the rod 116. As in the illustrated exemplary embodiment, the driving member 118 can be threadably coupled to the threaded portion of the rod 116. The driving member 118 can be configured to engage the second clamp member 114 intermediate or between its proximal end 152 and its distal end 156. The driving member 118 can be movable along the axis 142 of the rod 116 to engage the second clamp member 114 and to drive the second clamp member 114 axially along the central axis 142 of the elongate member 116. In the example provided, the driving member 118 can be a manually actuatable driving member, rotatable connector, T-handle, or thumbscrew such that rotation of the driving member 118 causes the driving member 118 to engage and drive the second clamp member 114 with the driving member 118 axially along the rod 116 (i.e., axially along the axis 142).

In operation, the clamp 110 can be coupled to the frame member 31 and the cargo box 11 to couple the tonneau cover 10 to the cargo box 11. In an unclamped position (FIG. 3), the pivot coupling or barrel 130 can be retained in the channel 28 and the driving member 118 can be located along the rod 116. While in an unclamped position, the barrel 130 can be slid within the channel 28 to move the clamp 110 axially along the frame member 31 (e.g., inboard or outboard) and the barrel 130 can be rotated within the channel 28 such that the clamp 110 can be pivoted relative to the frame member 31 and the cargo box 11 to clear the bottom edge 25 and align the downwardly extending flange 20 with the recess or space 180 between the proximal and distal ends 152 and 156, respectively, of the second clamp member 114.

In a first arrangement corresponding to the unclamped position (FIG. 3), the driving member 118 can be positioned at a first axial distance 170 from the barrel 130 or proximal end point of the rod 116 or first clamp member 112. Conversely, the driving member 118 can be positioned at a first axial distance 174 from a distal end point of the rod 116. Alternatively or additionally, in this first arrangement, the axis 142 of the elongate member 116 can extend at a first angle 190 relative to the tonneau cover 10, such as the axis 147 of the rail member 31. Additionally or alternatively, the axis 142 of the elongate member 116 can extend at a first angle 144 relative to the axis 146 of the first clamp member 112. In addition, the axis 146 of the first clamp member 112 can extend at a first angle 164 relative to the axis 160 of the second clamp member 114.

To move the clamp 110 from an unclamped position (FIG. 3) to an intermediate position (FIG. 4), the driving member 118 can be moved axially along the rod 116 toward the proximal end 124 of the first clamp member 112 and of the rod 116. In some embodiments, the driving member 118 can be rotated in a clockwise direction to move the driving member 118 along the rod 116 to cause the various components of the clamp 110 to pivot relative to each other, as should be apparent. In an intermediate position, the upwardly extending portion or lip 154 of the distal end 156 of the second clamp member 114 can begin extending into the channel or space between the inboard flange 20 and the outboard or outer wall 16. Continued movement of the driving member 118 can ultimately move the clamp 110 into a clamped position.

In a clamped position (FIG. 5), the driving member 118 can be positioned axially along the rod 116 further toward the proximal end 124 of the elongate member 116 or of the first clamp member 112. The upwardly extending portion or lip 154 of the distal end 156 of the second clamp member 114 can extend between the inboard flange 20 and the outboard or outer wall 16 allowing the clamping surface 176 of the second clamp member 114 to engage an interior side of the ledge 18 to provide a clamping force thereto. In some cases, the bottom edge 25 of the inboard flange can be positioned within the recess 180 of the second clamp member 114 so that the clamp 110 does not contact or does not apply a force to the downwardly extending inboard flange 20 that would be sufficient to permanently deform the flange 20.

In the clamped position (FIG. 5), the first clamp member 112 of the clamp can also cause a clamping surface to engage against the exterior side of the ledge 18. In some embodiments, the first clamp member 112 can cause the barrel 130, located above or exterior to the ledge 18, to cause a clamping surface to engage the ledge 18 when the clamp 110 is in the clamped position such that a compressive clamping force can be distributed only through the ledge 18 and not through the flange 20 or the outboard wall 16. In some embodiments, the first clamp member 112 can engage a clamping surface 194 (e.g., the portion of the frame member 31 adjacent the opening 30) between the barrel 130 (which can be a separate piece, part or component from the first clamp member 112) against the exterior surface of the ledge 18. Thus, the first clamp member 112, via the barrel 130, can engage a clamping surface 194 of the rail member 31 against the exterior surface of the ledge 18. The clamping surfaces 176 and 194 engaged against opposing sides of the ledge 18 via the first and second clamp members 112 and 114, respectively, can provide substantially aligned opposing or compressive clamping forces against opposite or opposing surfaces of the ledge 18.

In a second arrangement corresponding to the clamped position (FIG. 5), the driving member 118 can be positioned at a second axial distance 170 from the barrel 130 or proximal end point of the rod 116 or first clamp member 112. This second axial distance 170 of the driving member 118 in the clamped position or second arrangement can be less than in the unclamped position or first arrangement. Conversely, the driving member 118 can be positioned at a second axial distance 174 from a distal end point of the rod 116. This second axial distance 174 of the driving member 118 from the distal end point of the rod 116 in the clamped position or second arrangement can be greater in the clamped position or second arrangement than in the unclamped position or first arrangement.

Figure 5:
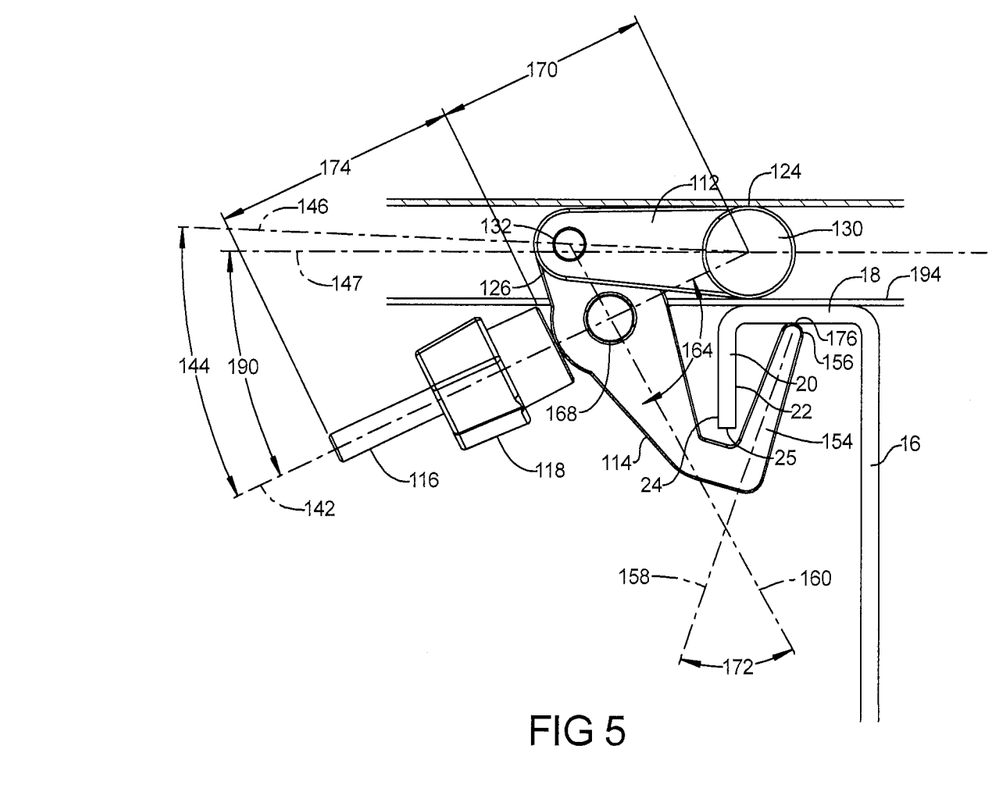
FIG. 5 is a side plan view of the clamp of FIG. 2 in a clamped position, with a partial cross-sectional view of the cargo box.
Figure 6:
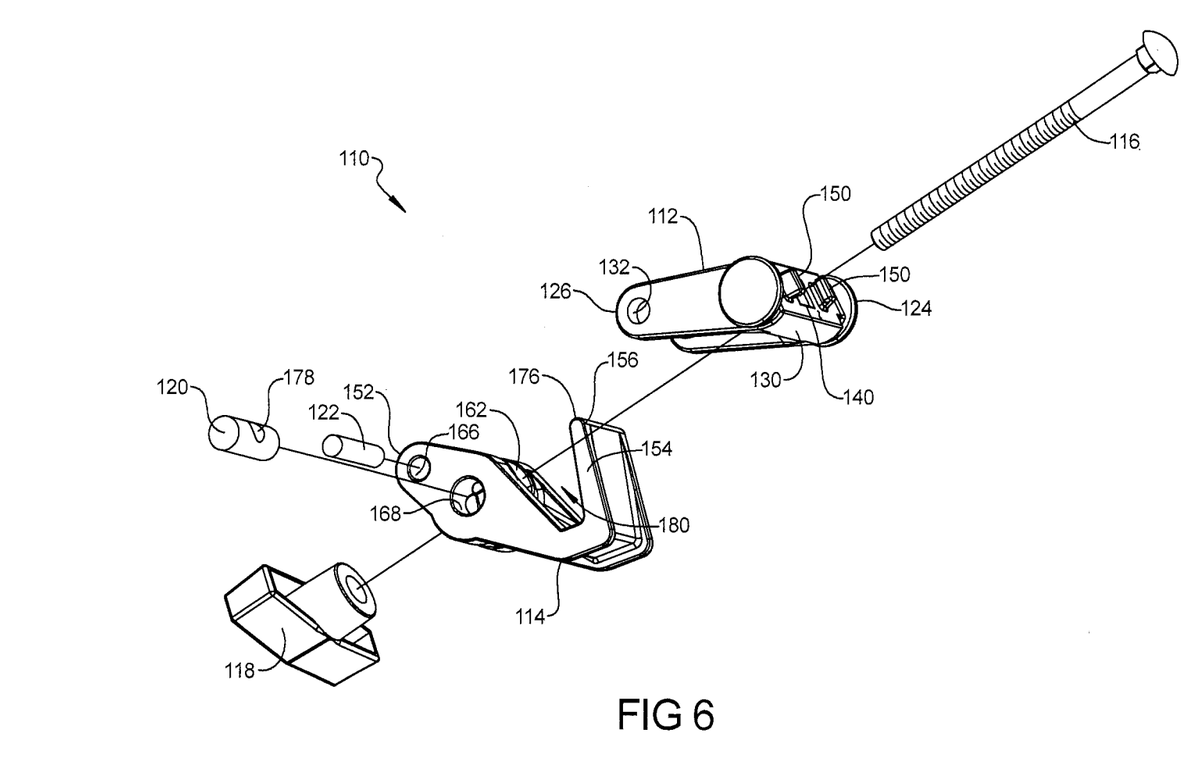
FIG. 6 is an exploded perspective view of the clamp of FIG. 2.

In the clamped position or second arrangement, the axis 142 of the elongate member 116 can extend at a second angle 190 relative to the tonneau cover 10, such as the axis 147 of the rail member 31. Additionally or alternatively, the axis 142 of the elongate member 116 can extend at a second angle 144 relative to the axis 146 of the first clamp member 112. The second angle of the axis 142 of the elongate member 116 relative to the axis 147 of the rail member 31 or to the axis 146 of the first clamp member 112 can be smaller than the respective first angles corresponding to the first arrangement or unclamped position.

In addition, in the clamped position or second arrangement, the axis 146 of the first clamp member 112 can extend at a second angle 164 relative to the axis 160 of the second clamp member 114. The second angle of the axis 146 of the first clamp member relative to the axis 160 of the second clamp member 114 can, in some embodiments, be smaller than the respective first angle corresponding to the first arrangement or unclamped position.

Release of the clamp 110 from the clamped position (FIG. 5) back to the unclamped position (FIG. 3) can be achieved by moving the driving member 118 axially in the opposite direction along the rod 116 (e.g., rotating the driving member 118 counter-clockwise) and generally backtracking the clamping process described above.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tonneau cover system for a cargo box of a pickup truck, the cargo box comprising a ledge and a flange extending downwardly from the ledge, the tonneau cover system comprising:
    a tonneau cover designed to cover the cargo box; and
    a clamp designed to secure the tonneau cover to the cargo box, the clamp comprising:
        a first clamp member pivotably coupled to the tonneau cover at a proximal end and having a distal end;
        a second clamp member having a proximal end pivotably coupled to the distal end of the first clamp member, and the second clamp member having a distal end comprising a portion extending at an angle relative to the proximal end of the second clamp member and toward the tonneau cover; and
        an elongate member coupled to the proximal end of the first clamp member and extending through an opening intermediate the proximal and distal ends of the second clamp member;
    wherein sliding movement of the second clamp member along the elongate member causes the first and second clamp members to pivot relative to each other between an unclamped position and a clamped position in which the distal end of the second clamp member is designed to extend adjacent the flange and to engage a first clamping surface of the distal end of the second clamp member against an interior surface of the ledge.

2. The tonneau cover system according to claim 1, wherein the first clamp member is designed to engage a second clamping surface against an exterior of the ledge and the first clamping surface of the second clamp member is designed to be positioned against the interior of the ledge to provide substantially aligned opposing forces against opposite surfaces of the ledge when in the clamped position.

3. The tonneau cover system according to claim 2, wherein the proximal end of the first clamp member is coupled to a structural rail member of the tonneau cover, and the structural rail member of the tonneau cover defines the second clamping surface designed to engage against the exterior of the ledge.

4. The tonneau cover system according to claim 1, further comprising a driving member mounted on the elongate member to engage the second clamp member between its proximal and distal ends and pivot the second clamp member relative to the first clamp member between the unclamped and clamped positions.

5. The tonneau cover system according to claim 4, wherein the elongate member comprises a threaded rod and the driving member comprises a manually rotatable connector threadably mounted on the rod.

6. The tonneau cover system according to claim 4, wherein the driving member is movable between a first arrangement corresponding to the unclamped position in which the driving member is spaced apart along the elongate member a first distance from the tonneau cover and said elongate member extends at a first angle relative to the tonneau cover, and a second arrangement corresponding to the clamped position in which the driving member engages the second clamp member and is spaced apart along the elongate member a second distance from the tonneau cover that is less than the first distance and the rod extends at a second angle relative to the tonneau cover that is less than the first angle.

7. The tonneau cover system according to claim 6, wherein the elongate member comprises a threaded rod and the driving member comprises a manually rotatable connector threadably mounted on the rod.

8. The tonneau cover system according to claim 1, wherein the second clamp member defines a recess between the proximal end and the distal end extending at the angle relative to the proximal end of the second clamp member and, when in the clamped position, the recess is designed to create a space between the downwardly extending flange and the second clamp member.

9. The tonneau cover system according to claim 8, wherein the first and second clamp members are designed to pivot apart and to permit the clamp to be pivoted relative to the tonneau cover in order to align the downwardly extending flange with the recess when in the unclamped position.

10. A tonneau cover clamp for clamping a tonneau cover to a cargo box of a pickup truck, the cargo box comprising a ledge and a flange extending downwardly from the ledge, the tonneau cover clamp comprising:
    a first clamp member designed to be pivotably coupled to the tonneau cover at a proximal end and having a distal end;
    a second clamp member having a proximal end pivotably coupled to the distal end of the first clamp member, and the second clamp member having a distal end comprising a portion extending at an angle relative to the proximal end of the second clamp member and designed to extend toward the tonneau cover;
    a rod defining an axis and coupled to the proximal end of the first clamp member and extending through an opening intermediate the proximal and distal ends of the second clamp member; and
    a manually actuatable driving member mounted on the rod to engage the second clamp member between its proximal and distal ends to drive the second clamp member along the axis of the rod and cause the first and second clamp members to pivot relative to each other between an unclamped position and a clamped position.

11. The tonneau cover clamp according to claim 10, wherein the rod comprises threads and the manually actuatable driving member comprises a manually rotatable connector threadably mounted on the rod.

12. The tonneau cover clamp according to claim 10, wherein the angle at which the distal end of the second clamp member extends relative to the proximal end of the second clamp member is designed to allow the distal end of the second clamp member to extend adjacent to the flange and to engage a clamping surface of the distal end of the second clamp member against an interior surface of the ledge when in the clamped position.

13. The tonneau cover clamp according to claim 10, wherein the first clamp member comprises a pivotable coupling structured designed to pivotably couple the clamp to a rail of the tonneau cover.

14. The tonneau cover clamp according to claim 10, wherein the manually actuatable driving member is movable between a first arrangement corresponding to the unclamped position in which the manually actuatable driving member is spaced apart along the rod a first distance from a distal end of the rod and said elongate member extends at a first angle relative to the first clamp member, and a second arrangement corresponding to the clamped position in which the manually actuatable driving member engages against the second clamp member and is spaced apart along the rod a second distance from the distal end of the rod that is greater than the first distance, and the rod extends at a second angle relative to the first clamp member that is less than the first angle.

15. The tonneau cover clamp according to claim 14, wherein the rod comprises threads and the manually actuatable driving member comprises a manually rotatable connector threadably mounted on the rod.

16. The tonneau cover clamp according to claim 10, wherein the angle at which the distal end of the second clamp member extends relative to the proximal end of the second clamp member defines a recess between the proximal end of the second clamp member and the distal end of the second clamp member designed to receive the downwardly extending flange in a non-contacting relationship when in the clamped position.

17. The tonneau cover clamp according to claim 16, wherein, when in the unclamped position, the first and second clamp members are designed to pivot apart sufficiently to permit the clamp to be pivoted relative to the tonneau cover in order to align the downwardly extending flange with the recess.

18. The tonneau cover clamp according to claim 17, wherein the rod comprises threads and the manually actuatable driving member comprises a manually rotatable connector threadably mounted on the rod.

19. A tonneau cover system for a cargo box of a pickup truck comprising:
a tonneau cover designed to cover the cargo box; and
a clamp designed to secure the tonneau cover to the cargo box comprising:
a first clamp member pivotably coupled to the tonneau cover at a proximal end and having a distal end;
a second clamp member having a proximal end pivotably coupled to the distal end of the first clamp member and having a distal end; and
an elongate member coupled to the proximal end of the first clamp member and extending through an opening intermediate the proximal and distal ends of the second clamp member;
wherein sliding movement of the second clamp member along the elongate member causes the first and second clamp members to pivot relative to each other between an unclamped position and a clamped position.

20. The tonneau cover system according to claim 19, wherein the distal end of the second clamp member is designed to extend adjacent a flange of the cargo box and to engage a first clamping surface of the distal end of the second clamp member against an interior surface of a ledge of the cargo box, and the first clamp member is designed to engage a second clamping surface against an exterior surface of the ledge, and the first and second clamping surfaces are designed to be positioned to provide substantially aligned opposing forces against opposite surfaces of the ledge when in the clamped position.

21. The tonneau cover system according to claim 20, wherein the proximal end of the first clamp member is coupled to a structural rail member of the tonneau cover, and the structural rail member of the tonneau cover defines the second clamping surface.

22. The tonneau cover system according to claim 19, further comprising a driving member mounted on the elongate member to engage the second clamp member between its proximal and distal ends and to pivot the second clamp member relative to the first clamp member between the unclamped and clamped positions.

23. The tonneau cover system according to claim 22, wherein the elongate member comprises a threaded rod and the driving member comprises a manually rotatable connector threadably mounted on the rod.

24. The tonneau cover system according to claim 22, wherein the driving member is movable between a first arrangement corresponding to the unclamped position in which the driving member is spaced apart along the elongate member a first distance from the tonneau cover and said elongate member extends at a first angle relative to the tonneau cover, and a second arrangement corresponding to the clamped position in which the driving member engages the second clamp member and is spaced apart along the elongate member a second distance from the tonneau cover that is less than the first distance and the rod extends at a second angle relative to the tonneau cover that is less than the first angle.

25. The tonneau cover system according to claim 24, wherein the elongate member comprises a threaded rod and the driving member comprises a manually rotatable connector threadably mounted on the rod.

26. The tonneau cover system according to claim 19, wherein the second clamp member defines a recess between the proximal end and the distal end extending at the angle relative to the proximal end of the second clamp member designed to receive a downwardly extending flange of the cargo box in a non-contacting relationship when in the clamped position.

27. The tonneau cover system according to claim 26, wherein the first and second clamp members are designed to pivot apart and to permit the clamp to be pivoted relative to the tonneau cover in order to position the recess relative to the downwardly extending flange.

* * * * *